(12) United States Patent
Nichols (10) Patent No.: US 7,477,184 B2
(45) Date of Patent: *Jan. 13, 2009

(54) 3-D POSITIONING SYSTEM UTILIZING SELF-POSITIONING RADIO TRANSMITTER AND STATIONARY LASER TRANSMITTER

(75) Inventor: Mark E. Nichols, Christchurch (NZ)

(73) Assignee: Trimble Navigation, Ltd, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/525,698

(22) Filed: Sep. 21, 2006

(65) Prior Publication Data

US 2007/0035440 A1   Feb. 15, 2007

Related U.S. Application Data

(63) Continuation of application No. 11/059,167, filed on Feb. 15, 2005, now Pat. No. 7,116,269.

(51) Int. Cl.
*G01S 5/10* (2006.01)
(52) U.S. Cl. .................. 342/357.08; 342/357.03; 342/357.09
(58) Field of Classification Search ................. 342/357.01–357.03, 357.06, 357.08, 357.09; 701/213, 215; 356/141.1, 141.3, 141.4
See application file for complete search history.

(56) References Cited

U.S. PATENT DOCUMENTS 6,433,866 B1   8/2002   Nichols
7,116,269 B2 * 10/2006   Nichols ................. 342/357.08

* cited by examiner

*Primary Examiner*—Dao L Phan
(74) *Attorney, Agent, or Firm*—Boris G. Tankhilevich (57) ABSTRACT

A radio and light based 3-D positioning system comprising a stationary self-positioning radio (pseudolite) transceiver, a stationary laser transmitter positioned in a location with known coordinates, and at least one mobile integrated radio receiver (pseudolite)/laser detector (RR_LD). The stationary self-positioning radio (pseudolite) transceiver is configured to receive a first plurality of external radio signals, is configured to determine its position coordinates based on the first plurality of received external radio signals, and is configured to broadcast at least one internal radio signal. The stationary laser transmitter is configured to broadcast at least one laser beam. At least one mobile integrated radio receiver (pseudolite)/laser detector (RR_LD) is configured to receive a second plurality of external radio signals, is configured to receive at least one internal radio signal, is configured to detect at least one laser beam, and is configured to determine its 3-D position coordinates based on a set of data selected from the group consisting of: {the second plurality of received external radio signals; at least one received internal radio signal; and at least one detected laser beam}.

21 Claims, 1 Drawing Sheet

FIG. 1

3-D POSITIONING SYSTEM UTILIZING SELF-POSITIONING RADIO TRANSMITTER AND STATIONARY LASER TRANSMITTER

This is the continuation application for the U.S. patent application Ser. No. 11/059,167, filed on Feb. 15, 2005, now U.S. Pat. No. 7,116,269 and entitled "RADIO AND LIGHT BASED THREE DIMENSIONAL POSITIONING SYSTEM".

BACKGROUND OF THE INVENTION

1. Field of the Invention

The current invention relates to machine control systems, and, more specifically, to a combination of a stationary laser system and a stationary radio positioning system configured to complement each other in order to optimize the machine control capabilities of prior art systems.

2. Discussion of the Prior Art

In recent times there have been advances in the area of radio ranging or pseudolite systems. A pseudolite is a ground based radio transmitter that works in the GPS band and transmits signals similar to the GPS system. Because of limitations on using the L band for non-military purposes a new form of "pseudolite" is being developed that uses alternative frequencies such as the 2.4 GHz license free band.

In recent times there have been also advances in rotating laser systems including plane lasers and fan laser systems. Plane lasers provide a reference plane of light. Fan lasers provide one or more planes of light that are rotated about an axis, from which a difference in elevation can be derived. The common technique for deriving the difference in elevation is by determining the difference in time between detection of two or more fan beams. These systems, such as the Trimble LaserStation and Topcon LaserZone systems provide accurate differences in elevation.

However, an inherent weakness in a radio positioning-based (or a pseudolite-based) system is the vertical accuracy, wherein an inherent weakness in a laser system is either its inability to provide horizontal position, or limitations on the range over which it can provide horizontal position.

SUMMARY OF THE INVENTION

The present invention addresses these problems by providing a positioning system comprising a radio positioning system and a laser positioning system that provides a better vertical accuracy than a satellite-based system can provide.

One aspect of the present invention is directed to a radio and light based 3-D positioning system.

In one embodiment, the radio and light based 3-D positioning system of the present invention comprises: a stationary self-positioning radio (pseudolite) transceiver, a stationary laser transmitter positioned in a location with known coordinates, and at least one mobile integrated radio receiver (pseudolite)/laser detector (RR_LD).

In one embodiment of the present invention, the stationary self-positioning radio transceiver further comprises a radio (pseudolite) transceiver configured to receive a first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}. In one embodiment of the present invention, the stationary self-positioning radio (pseudolite) transceiver is configured to receive the first plurality of external radio signals, is configured to determine its position coordinates based on the first plurality of received external radio signals, and is configured to broadcast at least one internal radio signal.

In one embodiment of the present invention, the stationary self-positioning radio transceiver further comprises a differential radio (pseudolite) transceiver.

In one embodiment, the radio and light based 3-D positioning system of the present invention further comprises a first wireless communication link configured to connect the differential radio (pseudolite) transceiver to the source of differential correction data, wherein the first wireless communication link is selected from the group consisting of: {a cellular link; a radio; a private radio band; a SiteNet 900 private radio network; a wireless Internet; and a satellite wireless communication link}. In this embodiment, the stationary self-positioning radio differential radio (pseudolite) transceiver is configured to receive the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}, and is configured to receive a set of differential corrections data broadcasted by at least one source selected from the group consisting of: {a Base Station, an RTK Base Station; a Virtual Base Station (VBS); and a pseudolite transmitter}. In this embodiment of the present invention, the differential radio (pseudolite) transceiver is configured to utilize the first plurality of external radio signals and the set of differential corrections data to obtain precise coordinate measurements of the differential radio (pseudolite) transceiver.

In one embodiment of the present invention, the stationary laser transmitter further comprises a plane laser transmitter configured to generate a reference laser beam providing a high accuracy vertical coordinate. In another embodiment of the present invention, the stationary laser transmitter further comprises a fan laser transmitter configured to generate at least one rotating fan-shaped laser beam.

In one embodiment of the present invention, at least one mobile integrated radio (pseudolite) receiver/laser detector (RR_LD) further comprises: a radio (pseudolite) positioning system receiver configured to receive the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}; and a laser detector configured to detect at least one laser beam generated by the stationary laser transmitter positioned in the location with known coordinates. In this embodiment of the present invention, the integrated radio (pseudolite) receiver/laser detector (RR_LD) is configured to determine its 3-D position coordinates at a first level of accuracy based on the second plurality of received external radio signals, and is configured to determine its elevation at a second level of accuracy based on at least one detected laser beam, wherein a set of measurements determined at the second level of accuracy is more accurate than the set of measurements determined at the first level of accuracy.

In one embodiment, the radio and light based 3-D positioning system of the present invention further comprises a second wireless link configured to connect the mobile integrated radio receiver/laser detector (RR_LD with the stationary self-positioning radio (pseudolite) transceiver. In one embodiment of the present invention, the second wireless communication link is selected from the group consisting of: {a cellular link; a radio; a private radio band; a SiteNet 900 private radio network; a wireless Internet; and a satellite wireless communication link}.

In one embodiment of the present invention, at least one mobile integrated radio receiver/laser detector (RR_LD) further comprises a first radio (pseudolite) positioning system receiver configured to receive the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}, a second radio (pseudolite) positioning system receiver configured to receive at least one internal radio signal broadcasted by the stationary self-positioning radio (pseudolite) transceiver by using the second wireless link, and a laser detector configured to detect at least one laser beam generated by the stationary laser transmitter positioned in the location with known coordinates. In this embodiment of the present invention, the integrated radio (pseudolite) receiver/laser detector (RR_LD) is configured to determine its 3-D position coordinates at a first level of accuracy based on the second plurality of received external radio signals, and based on at least one received internal radio signal. In this embodiment of the present invention, the integrated radio (pseudolite) receiver/laser detector (RR_LD) is configured to determine its elevation at a second level of accuracy based on at least one detected laser beam. The set of measurements determined at the second level of accuracy is more accurate than the set of measurements determined at the first level of accuracy.

In one embodiment of the present invention, at least one mobile integrated radio receiver/laser detector (RR_LD) further comprises a first radio (pseudolite) receiver configured to receive a first set of measurement data from the second plurality of external radio signals, a second radio (pseudolite) receiver configured to receive a second set of measurement data from at least one internal radio signal broadcasted by the stationary self-positioning radio (pseudolite) transceiver by using the second wireless link, a laser detector configured to detect at least one laser beam in order to receive a third set of measurement data, and a weighting processor. In this embodiment of the present invention, the weighting processor is configured to assign different weights to different sets of measurement data based on a measurement algorithm. In one embodiment of the present invention, the measurement algorithm is optimized to take into account at least one measurement site parameter at the time of measurement, wherein each measurement site parameter is selected from the group consisting of: {topology of the site; whether conditions at the site; and visibility of at least one laser beam at the site}.

Another aspect of the present invention is directed to a method of determining the position coordinates of a mobile user.

In one embodiment, the method of the present invention comprises: (A) providing a radio and light based 3-D positioning system comprising a stationary self-positioning radio (pseudolite) transceiver, a stationary laser transmitter positioned in a location with known coordinates, and a mobile integrated radio receiver/laser detector (RR_LD); (B) receiving a first plurality of external radio signals by using the stationary self-positioning radio (pseudolite) transceiver; (C) determining position coordinates of the stationary self-positioning radio (pseudolite) transceiver based on the first plurality of received external radio signals; (D) broadcasting at least one internal radio signal by the stationary self-positioning radio (pseudolite) transceiver; (E) generating at least one laser beam by using the stationary laser transmitter positioned in the location with known coordinates; (F) receiving a second plurality of external radio signals, receiving at least one internal radio signal broadcasted by the stationary self-positioning radio (pseudolite) transceiver, and detecting at least one laser beam generated by the stationary laser transmitter positioned in the location with known coordinates; and (G) determining the 3-D position coordinates of the mobile integrated radio receiver/laser detector (RR_LD) based on a set of data selected from the group consisting of: {the second plurality of received external radio signals; at least one received internal radio signal; and at least one detected laser beam}.

In one embodiment of the present invention, the step (B) further comprises: (B1) receiving the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment of the present invention, the step (E) further comprises: (E1) generating a reference laser beam providing a high accuracy vertical coordinate by using a plane laser transmitter.

In one embodiment of the present invention, the step (E) further comprises: (E2) generating at least one rotating fan-shaped laser beam by using a fan laser transmitter.

In one embodiment of the present invention, the step (F) further comprises: (F1) receiving the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}; and (F2) detecting at least one laser beam generated by the stationary laser transmitter positioned in the location with known coordinates.

In one embodiment of the present invention, the step (G) further comprises: (G1) determining the 3-D position coordinates of the mobile integrated radio (pseudolite) receiver/laser detector (RR_LD) at the first level of accuracy based on the second plurality of received external radio signals and based on at least one internal radio signal broadcasted by the stationary self positioning radio (pseudolite) transceiver; and (G2) determining the elevation coordinate of the mobile integrated radio receiver/laser detector (RR_LD) at the second level of accuracy based on at least one detected laser beam. The set of measurements determined at the second level of accuracy is more accurate than the set of measurements determined at the first level of accuracy.

In one embodiment of the present invention, the step (G) further comprises: (G3) assigning different weights to different sets of measurement data based on a measurement algorithm by using a weighting processor; wherein the measurement algorithm is optimized to take into account at least one measurement site parameter at the time of measurement; and wherein each the measurement site parameter is selected from the group consisting of: {topology of the site; whether conditions at the site; and visibility of at least one laser beam at the site}.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
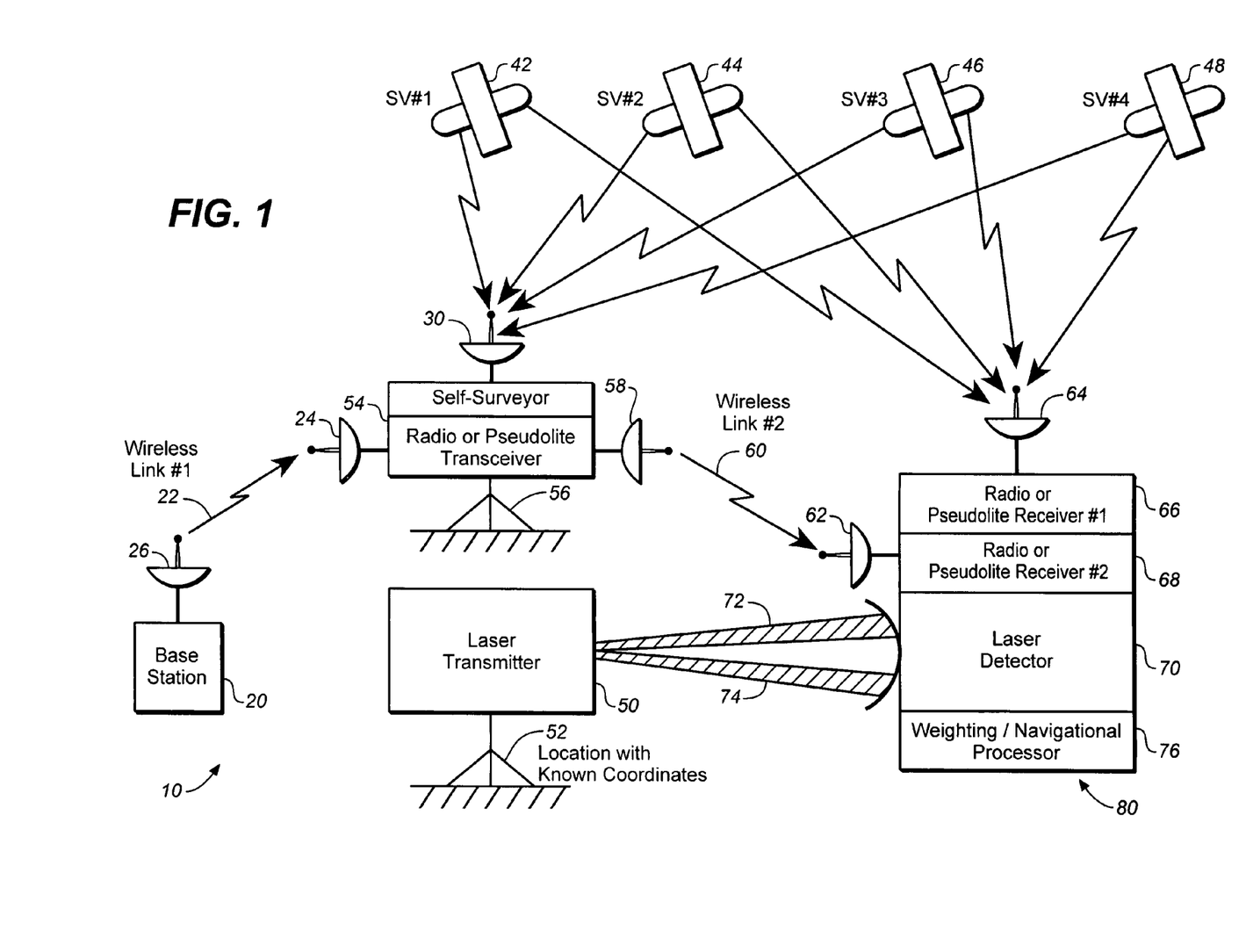
FIG. 1 depicts a radio and light based 3-D positioning system of the present invention comprising a stationary self-positioning radio (pseudolite) transceiver, a stationary laser transmitter positioned in a location with known coordinates, and at least one mobile integrated radio receiver/laser detector (RR_LD).

In one embodiment of the present invention, FIG. 1 depicts a radio and light based 3-D positioning system 10 of the present invention comprising a stationary self-positioning radio (pseudolite) transceiver 54, a stationary laser transmitter 56 positioned in a location with known coordinates, and at least one mobile integrated radio receiver/laser detector (RR_LD) 80.

In one embodiment of the present invention, the stationary self-positioning radio transceiver further comprises a radio (pseudolite) transceiver configured to receive a first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

The Global Positioning System (GPS) is a system of satellite signal transmitters that transmits information from which an observer's present location and/or the time of observation can be determined. The GPS system is fully described in the document ICD-GPS-200: GPS Interface Control Document, ARINC Research, 1997, GPS Joint Program Office, which is incorporated by reference herein.

Another satellite-based navigation system is called the Global Orbiting Navigational System (GLONASS), which can operate as an alternative or supplemental system. The GLONASS system was placed in orbit by the former Soviet Union and now maintained by the Russian Republic.

As disclosed in the European Commission "White Paper on European transport policy for 2010", the European Union will develop an independent satellite navigation system GALILEO as a part of a global navigation satellite infrastructure (GNSS).

Reference to a radio positioning system herein refers to a Global Positioning System (GPS), to a Global Orbiting Navigation System (GLONASS), to GALILEO System, and to any other compatible Global Navigational Satellite System (GNSS) satellite-based system that provides information by which an observer's position and the time of observation can be determined, all of which meet the requirements of the present invention.

Referring still to FIG. 1, in one embodiment of the present invention, the radio transceiver 54 further comprises a pseudolite transceiver 54 configured to receive the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}. Preferably, the pseudolite transceiver 54 is configured to receive the first plurality of external radio signals broadcasted by at least four radio sources selected from the group consisting of: {GPS; GLONASS; combined GPS/GLONASS; GALILEO; Global Navigational Satellite System (GNSS); and a pseudolite transmitter}.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands. Pseudolites can be used for enhancing the GPS by providing increased accuracy, integrity, and availability.

The complete description of the pseudolite transmitters in GPS band can be found in 'Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Uticom, Santa Barbara, Calif.

Pseudolites as radio positioning systems can be configured to operate in ISM band.

In one embodiment of the present invention, the stationary self-positioning radio (pseudolite) transceiver 54 (of FIG. 1) is configured to receive the first plurality of external radio signals, is configured to determine its position coordinates based on the first plurality of received external radio signals, and is configured to broadcast at least one internal radio signal.

In one embodiment of the present invention, the stationary self-positioning radio transceiver 54 (of FIG. 1) further comprises a differential radio (pseudolite) transceiver. In differential position determination, many of the errors in the radio positioning signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources.

Referring still to FIG. 1, in one embodiment of the present invention, the differential GPS receiver 54 can obtain the differential corrections from a Base Station 20 by using a first wireless link 22.

The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the Base Station location and the Base Station clock. With proper equipment, a relative accuracy of 5 meters should be possible at distances of a few hundred kilometers from the Base Station.

Referring still to FIG. 1, in another embodiment of the present invention, the differential GPS receiver 54 can be implemented by using a TRIMBLE Ag GPS-132 receiver that obtains the differential corrections from the U. S. Cost Guard service free in 300 kHz band broadcast by using the wireless communication device (not shown) and the first wireless communication link 22.

Referring still to FIG. 1, in one embodiment of the present invention, the differential corrections can be obtained from the Wide Area Augmentation System (WAAS) by using the wireless communication device (not shown) and the first wireless communication link 22. The WAAS system includes a network of Base Stations that uses satellites (initially geo-stationary satellites-GEOs) to broadcast GPS integrity and correction data to GPS users. The WAAS provides a ranging signal that augments the GPS that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is better than 1 meter.

Referring still to FIG. 1, in one embodiment of the present invention, the real time kinematic (RTK) differential GPS receiver 54 can be used to obtain the position locations with less than 2 cm accuracy. The RTK differential GPS receiver receives the differential corrections from the Base Station 20 placed in a known location within (10-50) km by using the wireless communication device (not shown) and the first wireless communication link 22. For a high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem that is the problem of determining the number of whole cycles of the carrier satellite signal between the GPS satellite being observed and the RTK GPS receiver. Indeed, the error in one carrier cycle L1 (or L2) can change the measurement result by 19 (or 24) centimeters, which is an unacceptable error for the centimeter-level accuracy measurements.

Referring still to FIG. 1, in one embodiment of the present invention, the differential corrections can be obtained by the radio transceiver 54 from the Virtual Base Station (VBS) 20 by using the wireless communication device (not shown) and the first wireless communication link 22.

The Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location. These corrections can be delivered to the radio transceiver 54 by using the first wireless communication link 22 and a wireless communication device (not shown).

An article "Long-Range RTK Positioning Using Virtual Reference Stations," by Ulrich Vollath, Alois Deking, Herbert Landau, and Christian Pagels, describing VRS in more details, is incorporated herein as a reference in its entirety, and can be accessed at the following URL: http://trl.trimble.com/dscgi/ds.py/Get/File-93152/KIS2001-Paper-LongRange.pdf.

Referring still to FIG. 1, in one embodiment of the present invention, the first wireless communication link 22 can be implemented by using a variety of different embodiments.

In general, the first wireless communication link 22 (of FIG. 1) can be implemented by using a radiowave frequency band, an infrared frequency band, or a microwave frequency band. In one embodiment, the wireless communication link can include the ISM band, including 900 MHZ, 2.4 GHz, or 5.8 GHz bands, wherein the user can own both ends of the ISM communication system.

In one embodiment of the present invention, the first wireless communication link 22 (of FIG. 1) can be implemented by using the Trimble SiteNet™ 900 private radio network. The Trimble SiteNet™ 900 private radio network is a rugged, multi-network, 900 MHz radio modem designed specifically for the construction and mining industries. It is used to establish robust, wireless data broadcast networks for real-time, high-precision GPS applications. This versatile Trimble radio operates in the frequency range of 902-928 MHz, broadcasting, repeating, and receiving real-time data used by Trimble GPS receivers. Under optimal conditions, the SiteNet 900 radio broadcasts data up to 10 km (6.2 miles) line-of-sight and coverage can be enhanced by using a network of multi-repeaters. Using the SiteNet 900 radio as a repeater, enables one to provide coverage in previously inaccessible or obstructed locations. The SiteNet 900 radio is so versatile, that one can easily change its operating mode to suit any network configuration. This reduces costs and maximizes uptime. Additionally, SiteNet 900 is license free in the U.S.A. and Canada, which makes it extremely portable. One can move it from project to project without licensing hassles and restrictions. The SiteNet 900 radio is designed to operate reliably in demanding RF environments where many other products and technologies cannot. Optimized for GPS with increased sensitivity and jamming immunity, the SiteNet 900 radio also has error correction, and a high-speed data rate, ensuring maximum performance. The SiteNet 900 radio is especially suited for use with Trimble's SiteVision™ GPS grade control system, and is ideal for all GPS machine control applications where reliability is important. The machine-rugged unit has been designed and built especially for harsh construction and mining environments. Fully sealed against dust, rain, splash, and spray, the SiteNet 900 radio remains reliable in all weather. The radio's ruggedness and reliability minimizes downtime, lowering ownership costs. Trimble's SiteNet 900 radio can be used with any Trimble GPS receiver, including: MS750, MS850, MS860, and 5700 receivers.

In one embodiment of the present invention, the first wireless communication link 22 (of FIG. 1) can be implemented by using a 1.8 GHz band that supports the personal communications services (PCS). The PCS uses the international standard DCS-1800. Yet, in one more embodiment, the first wireless communication link can include a real time circuit switched wireless communication link. For instance, the first wireless communication link employing a real time circuit switched wireless communication link can include the Iridium satellite system produced by Motorola, Schaumburg, Ill.

In one additional embodiment, the first wireless communication link can be implemented by using a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20-30) GHz range are manufactured by Cellular Communications located in Redmond, Wash., and the LEOS systems in (1.6-2.5) GHz range are produced by Loral/Qualcomm located in San Diego, Calif.

The first wireless communication link 22 can also include a cellular telephone communication means, a paging signal receiving means, wireless messaging services, wireless application services, a wireless WAN/LAN station, or an Earth-satellite-Earth communication module that uses at least one satellite to relay a radiowave signal. The first wireless communication link can also include the cellular telephone communication means that can include an Advanced Mobile Phone System (AMPS) with a modem. The modem can comprise a DSP (digital signal processor) modem in 800 MHZ range, or a cellular digital packet data (CDPD) modem in 800 MHZ range. The cellular digital communication means includes a means of modulation of digital data over a radio link using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

Referring still to FIG. 1, n one embodiment of the present invention, the laser transmitter 50 further comprises a plane laser transmitter configured to generate a reference laser beam 72 (or 74) providing a high accuracy vertical coordinate. Similar plane laser transmitter is fully disclosed in the U.S. Pat. No. 6,433,866 "High precision GPS/RTK and laser machine control" assigned to the assignee of the present invention. The U.S. Pat. No. 6,433,866 is incorporated herein in its entirety.

More specifically, according to the '866 patent, the laser transmitter 50 includes a rotating laser system. In a rotating laser system a laser source spins (mechanically, or optically) in the horizontal plane (or Z-plane). The rotating laser emits a laser beam that provides an accurate reference plane with a millimeter accuracy. However, to detect and get benefit of the rotating laser beam, the potential user has to be located within vertical range, and has to be equipped with a laser detector (or a laser receiver) capable of receiving the rotating laser beam. In the mechanical embodiment, the motor physically rotates the laser and accordingly the laser beam. In the optical embodiment, the mirror rotates in such a way that the physically non-rotating laser emits the rotating laser beam.

Trimble Navigation Ltd. manufactures 3D Laser Station that generates at least one rotating fan-shaped laser beam 72 (or 74). The detailed description of such fan laser transmitter 50 is given in the copending published US patent application US-2006-0012777 entitled "COMBINATION LASER SYSTEM AND GLOBAL NAVIGATION SATELLITE SYSTEM" that is incorporated by reference herein in its entirety. The copending US patent application US-2006-0012777 is assigned to the assignee of the present patent application.

Referring still to FIG. 1, in one embodiment of the present invention, the mobile integrated radio receiver/laser detector (RR_LD) 80 further comprises a first radio (pseudolite) positioning system receiver 66, a second radio (pseudolite) positioning system receiver 68, and a laser detector 70 integrated with the radio positioning system receivers 66 and 68.

In one embodiment of the present invention, each mobile unit 80 is equipped with a laser detector 70 comprising a number of diodes. A laser receiver measures the signal strength on a number of diodes to determine the center of a laser beam. Topcon, Laser Systems, Inc., located in Pleasanton, Calif., manufactures machine mounted laser receivers: 9130 laser tracker and LS-B2 laser receiver. For reference, please see the '866 U.S. Pat.

In one embodiment of the present invention, the first radio (pseudolite) positioning system receiver 66 is configured to receive the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

Preferably, in one embodiment of the present invention, the first radio (pseudolite) positioning system receiver 66 is configured to receive the second plurality of external radio signals broadcasted by at least four radio sources selected from the group consisting of: {GPS; GLONASS; combined GPS/GLONASS; GALILEO; Global Navigational Satellite System (GNSS); and a pseudolite transmitter}.

In one embodiment of the present invention, the stationary radio (pseudolite) transceiver 54 and the first mobile radio (pseudolite) receiver 66 are selected to include the same GPS receiver configured to receive the satellite signals from the four GPS satellite-vehicles SV#1 42, SV#2 44, SV#3 46, and SV#4 48.

In one embodiment of the present invention, the first radio (pseudolite) positioning system receiver 66 is configured to determine its 3-D position coordinates based on the second plurality of received external radio signals by using its navigational processor (not shown). In this embodiment of the present invention, the mobile integrated radio (pseudolite) receiver/laser detector (RR_LD) 80 is configured to determine its 3-D position coordinates at the first level of accuracy (at the meter or at the centimeter level) based on the second plurality of received external radio signals, and is configured to determine its elevation at the second level of accuracy (at the millimeter level) based on at least one detected laser beam 72 (and/or 74) by using its navigation processor (not shown).

Referring still to FIG. 1, in one embodiment of the present invention, the radio and light based 3-D positioning system 10 further comprises a second wireless communication link 60 configured to connect the mobile integrated radio (pseudolite) receiver/laser detector (RR_LD) 80 with the stationary self-positioning radio (pseudolite) transceiver 54. In one embodiment of the present invention, the second wireless communication link 60 is selected from the group consisting of: {a cellular link; a radio; a private radio band; a SiteNet 900 private radio network; a wireless Internet; and a satellite wireless communication link}.

In this embodiment of the present invention, the second radio (pseudolite) receiver 68 is configured to receive at least one internal radio signal broadcasted by the radio transceiver 54 by using the second wireless link 60 and antenna 62. In this embodiment of the present invention, the mobile integrated radio (pseudolite) receiver/laser detector (RR_LD) 80 is configured to determine its 3-D position coordinates at the first (meter or centimeter) level of accuracy based on at least one internal radio signal broadcasted by the stationary self-positioning radio (pseudolite) transceiver 54, and is configured to determine its elevation at the second (millimeter) level of accuracy based on at least one detected laser beam 72 (and/or 74).

Referring still to FIG. 1, in one embodiment of the present invention, the first radio (pseudolite) receiver 66 is configured to receive the second plurality of external radio signals, the second radio (pseudolite) pseudolite receiver 68 is configured to receive at least one internal radio signal broadcasted by the transceiver 54 by using the second wireless link 60, and the laser detector 70 is configured to detect at least one laser beam 72 (and/or 74) generated by the stationary laser transmitter 50. In this embodiment of the present invention, the mobile integrated radio (pseudolite) receiver/laser detector (RR_LD) 80 is configured to determine its 3-D position coordinates at the first (centimeter or meter) level of accuracy based on at least one internal radio signal broadcasted by the stationary radio transceiver 54 and based on the second plurality of received external radio signals broadcasted by the satellites SV#1 42, SV#2 44, SV#3 46, and SV#4 48, or broadcasted by some other external radio-sources (not shown), and is configured to determine its elevation at the second (millimeter) level of accuracy based on at least one detected laser beam 72 (and/or 74).

Referring still to FIG. 1, in one embodiment of the present invention, the mobile integrated radio (pseudolite) receiver/laser detector (RR_LD) 80 further comprises the weighting/navigational processor 76 configured to assign different weights to different sets of measurement data based on a measurement algorithm.

EXAMPLE

The measurement algorithm takes into account a plurality of measurement site parameters selected from the group consisting of: {topology of the site; whether conditions at the site; and visibility of at least one laser beam at the site}. (A) If topology of the site is such that there is no clear view of the sky, the set of measurements based on the external satellite radio signals has a low priority and is assigned the lowest weighting factor. (B) If whether conditions at the site are such that the visibility of at least one laser beam at the site is good, the set of measurements based on the detected laser data should be assigned the highest weighting factor. (C) If whether conditions at the site are such that the visibility of at least one laser beam at the site is bad, the set of measurements based on the detected laser data should be assigned the lowest weighting factor.

Another aspect of the present invention is directed to the method of determining the position coordinates of a mobile user 80 by using the radio and light based 3-D positioning system 10 of FIG. 1.

In one embodiment, the method of the present invention comprises (not shown): (A) providing a radio and light based 3-D positioning system 10 comprising a stationary self-positioning radio (pseudolite) transceiver 54, a stationary laser transmitter 50 positioned in a location 52 with known coordinates, and a mobile integrated radio receiver/laser detector (RR_LD) 80; (B) receiving a first plurality of external radio signals by using the stationary self-positioning radio (pseudolite) transceiver 54; (C) determining position coordinates of the stationary self-positioning radio (pseudolite) transceiver 54 based on the first plurality of received external radio signals; (D) broadcasting at least one internal radio signal by the stationary self-positioning radio (pseudolite) transceiver 54; (E) generating at least one laser beam 72 (or 74) by using the stationary laser transmitter 50 positioned in the location 52 with known coordinates; (F) receiving a second plurality of external radio signals by using the first radio (pseudolite) receiver 66, receiving at least one internal radio signal by using the second radio (pseudolite) receiver 68, and detecting the laser beam 72 (and/or 74) by using the laser detector 70; and (G) determining the 3-D position coordinates of the mobile integrated radio receiver/laser detector (RR_LD) 80 based on a set of data selected from the group consisting of: {the second plurality of received external radio signals; at least one received internal radio signal; and at least one detected laser beam}.

In one embodiment of the present invention, the step (B) further comprises (not shown): (B1) receiving the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment of the present invention, the step (E) further comprises (not shown): (E1) generating at least one reference laser beam 72 (and/or 74) to provide a high accuracy vertical coordinate by using a plane laser transmitter 50.

In one embodiment of the present invention, the step (E) further comprises (not shown): (E2) generating at least one rotating fan-shaped laser beam 72 (and/or 74) by using a fan laser transmitter 50.

In one embodiment of the present invention, the step (F) further comprises: (F1) receiving the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter} by using the first radio (pseudolite) receiver 66; and (F2) detecting at least one laser beam 72 (and/or 74) generated by the stationary laser transmitter 50 positioned in the location 52 with known coordinates by using the laser detector 70.

In one embodiment of the present invention, the step (G) further comprises: (G1) determining the 3-D position coordinates of the mobile integrated radio (pseudolite) receiver/laser detector (RR_LD) 80 at the first level of accuracy based on the second plurality of received external radio signals and based on at least one internal radio signal broadcasted by the stationary self positioning radio (pseudolite) transceiver 54; and (G2) determining the elevation coordinate of the mobile integrated radio receiver/laser detector (RR_LD) 80 at the second level of accuracy based on at least one detected laser beam 72 (and/or 74). The set of measurements determined at the second level of accuracy is more accurate than the set of measurements determined at the first level of accuracy.

In one embodiment of the present invention, the step (G) further comprises (not shown): (G3) assigning different weights to different sets of measurement data based on a measurement algorithm by using the weighting processor 76. In one embodiment of the present invention, the measurement algorithm (not shown) is optimized to take into account at least one measurement site parameter at the time of measurement, wherein each measurement site parameter is selected from the group consisting of: {topology of the site; whether conditions at the site; and visibility of at least one laser beam at the site}.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A radio and light based 3-D positioning system comprising:
- a stationary self-positioning radio (pseudolite) transceiver configured to receive a first plurality of external radio signals, configured to determine its position coordinates based on said first plurality of received external radio signals, configured to broadcast at least one internal radio signal;
- a stationary laser transmitter positioned in a location with known coordinates; said stationary laser transmitter configured to broadcast at least one laser beam; and
- at least one mobile integrated radio receiver (pseudolite)/laser detector (RR_LD) configured to receive a second plurality of external radio signals, configured to receive at least one said internal radio signal broadcasted by said stationary self-positioning radio transceiver; configured to detect at least one said laser beam generated by said stationary laser transmitter; and configured to determine its 3-D position coordinates based on a set of data selected from the group consisting of: Said second plurality of received external radio signals; said at least one received internal radio signal; and said at least one detected laser beam.

2. The system of claim 1, wherein said stationary self-positioning radio transceiver further comprises:
- a radio (pseudolite) transceiver configured to receive said first plurality of external radio signals broadcasted by at least one radio source selected from the group consisting of: GPS; GLONASS; combined GPS/GLONASS; GALILEO; Global Navigational Satellite System (GNSS); and a pseudolite transmitter.

3. The system of claim 1, wherein said stationary self-positioning radio transceiver further comprises:
- a differential radio (pseudolite) transceiver configured to receive said first plurality of external radio signals broadcasted by said at least one radio source selected from the group consisting of: GPS; GLONASS; combined GPS/GLONASS; GALILEO; Global Navigational Satellite System (GNSS); and a pseudolite transmitter; and configured to receive a set of differential corrections data broadcasted by at least one source selected from the group consisting of: a Base Station, an RTK Base Station; a Virtual Base Station (VBS); and a pseudolite transmitter; wherein said differential radio (pseudolite) transceiver is configured to utilize said first plurality of external radio signals and said set of differential corrections data to obtain precise coordinate measurements of said differential radio (pseudolite) transceiver.

4. The system of claim 3 further comprising:
- a first wireless communication link configured to connect said differential radio (pseudolite) transceiver to said source of differential correction data; and wherein said first wireless communication link is selected from the group consisting of: a cellular link; a radio; a private radio band; a SiteNet 900 private radio network; a wireless Internet; and a satellite wireless communication link.

5. The system of claim 1, wherein said stationary laser transmitter positioned in said location with known coordinates laser transmitter further comprises:
- a plane laser transmitter configured to generate a reference laser beam providing a high accuracy vertical coordinate.

6. The system of claim 1, wherein said stationary laser transmitter positioned in said location with known coordinates laser transmitter further comprises:
- a fan laser transmitter configured to generate at least one rotating fan-shaped laser beam.

7. The system of claim 1, wherein said at least one mobile integrated radio (pseudolite) receiver/laser detector (RR_LD) further comprises:
- a radio (pseudolite) positioning system receiver configured to receive said second plurality of external radio signals broadcasted by at least one radio source selected from the group consisting of: GPS; GLONASS; combined GPS/GLONASS; GALILEO; Global Navigational Satellite System (GNSS); and a pseudolite transmitter; and
- a laser detector configured to detect at least one said laser beam generated by said stationary laser transmitter positioned in said location with known coordinates;
- wherein said integrated radio (pseudolite) receiver/laser detector (RR_LD) is configured to determine its 3-D position coordinates at a first level of accuracy based on said second plurality of received external radio signals;
- wherein said integrated radio (pseudolite) receiver/laser detector (RR_LD) is configured to determine its elevation at a second level of accuracy based on said at least one detected laser beam;
- and wherein a set of measurements determined at said second level of accuracy is more accurate than said set of measurements determined at said first level of accuracy.

8. The system of claim 1 further comprising:
- a second wireless link configured to connect said mobile integrated radio receiver/laser detector (RR_LD with said stationary self-positioning radio (pseudolite) transceiver;
- and wherein said second wireless communication link is selected from the group consisting of: a cellular link; a radio; a private radio band; a SiteNet 900 private radio network; a wireless Internet; and a satellite wireless communication link.

9. The system of claim 8, wherein said at least one mobile integrated radio receiver/laser detector (RR_LD) further comprises:
- a first radio (pseudolite) positioning system receiver configured to receive said second plurality of external radio signals broadcasted by at least one radio source selected from the group consisting of: GPS; GLONASS; combined GPS/GLONASS; GALILEO; Global Navigational Satellite System (GNSS); and a pseudolite transmitter;
- a second radio (pseudolite) positioning system receiver configured to receive at least one said internal radio signal broadcasted by said stationary self-positioning radio (pseudolite) transceiver by using said second wireless link; and
- a laser detector configured to detect at least one said laser beam generated by said stationary laser transmitter positioned in said location with known coordinates;
- wherein said integrated radio (pseudolite) receiver/laser detector (RR_LD) is configured to determine its 3-D position coordinates at a first level of accuracy based on said second plurality of received external radio signals, and based on said received at least one internal radio signal;

wherein said integrated radio (pseudolite) receiver/laser detector (RR_LD) is configured to determine its elevation at a second level of accuracy based on said at least one detected laser beam;

and wherein a set of measurements determined at said second level of accuracy is more accurate than said set of measurements determined at said first level of accuracy.

10. The system of claim 8, wherein said at least one mobile integrated radio receiver/laser detector (RR_LD) further comprises:
a first radio (pseudolite) receiver configured to receive a first set of measurement data from said second plurality of external radio signals;
a second radio (pseudolite) receiver configured to receive a second set of measurement data from at least one said internal radio signal broadcasted by said stationary self-positioning radio (pseudolite) transceiver by using said second wireless link;
a laser detector configured to detect at least one said laser beam generated by said stationary laser transmitter positioned in said location with known coordinates in order to receive a third set of measurement data; and
a weighting processor;
wherein said weighting processor is configured to assign different weights to different sets of measurement data based on a measurement algorithm.

11. The system of claim 10, wherein said measurement algorithm is optimized to take into account at least one measurement site parameter at the time of measurement; and wherein each said measurement site parameter is selected from the group consisting of: topology of said site; weather conditions at said site; and visibility of at least one said laser beam at said site.

12. A radio and light based 3-D positioning system comprising:
a stationary self-positioning radio (pseudolite) transceiver configured to receive a first plurality of external radio signals, configured to determine its position coordinates based on said first plurality of received external radio signals, configured to broadcast at least one internal radio signal; and
a stationary laser transmitter positioned in a location with known coordinates; said stationary laser transmitter configured to broadcast at least one laser beam;
wherein at least one mobile integrated radio receiver (pseudolite)/laser detector (RR_LD) is configured to receive a second plurality of external radio signals, is configured to receive at least one said internal radio signal broadcasted by said stationary self-positioning radio transceiver; is configured to detect at least one said laser beam generated by said stationary laser transmitter; and is configured to determine its 3-D position coordinates based on a set of data selected from the group consisting of: said second plurality of received external radio signals; said at least one received internal radio signal; and said at least one detected laser beam.

13. A method of determining the position coordinates of a mobile user comprising:
(A) providing a radio and light based 3-D positioning system comprising a stationary self-positioning radio (pseudolite) transceiver, a stationary laser transmitter positioned in a location with known coordinates, and said mobile user comprising a mobile integrated radio receiver/laser detector (RR_LD);
(B) receiving a first plurality of external radio signals by using said stationary self-positioning radio (pseudolite) transceiver;
(C) determining position coordinates of said stationary self-positioning radio (pseudolite) transceiver based on said first plurality of received external radio signals;
(D) broadcasting at least one internal radio signal by said stationary self-positioning radio (pseudolite) transceiver;
(E) generating at least one laser beam by using said stationary laser transmitter positioned in said location with known coordinates;
(F) receiving a second plurality of external radio signals, receiving at least one said internal radio signal broadcasted by said stationary self-positioning radio (pseudolite) transceiver; and detecting said laser beam generated by said stationary laser transmitter positioned in said location with known coordinates; and
(G) determining the 3-D position coordinates of said mobile integrated radio receiver/laser detector (RR_LD) based on a set of data selected from the group consisting of: said second plurality of received external radio signals; said at least one received internal radio signal; and said at least one detected laser beam.

14. The method of claim 13, wherein said step (B) further comprises:
(B1) receiving said second plurality of external radio signals broadcasted by at least one radio source selected from the group consisting of: GPS; GLONASS; combined GPS/GLONASS; GALILEO; Global Navigational Satellite System (GNSS); and a pseudolite transmitter.

15. The method of claim 13, wherein said step (E) further comprises:
(E1) generating a reference laser beam providing a high accuracy vertical coordinate by using a plane laser transmitter.

16. The method of claim 13, wherein said step (E) further comprises:
(E2) generating at least one rotating fan-shaped laser beam by using a fan laser transmitter.

17. The method of claim 13, wherein said step (F) further comprises:
(F1) receiving said second plurality of external radio signals broadcasted by at least one radio source selected from the group consisting of: GPS; GLONASS; combined GPS/GLONASS; GALILEO; Global Navigational Satellite System (GNSS); and a pseudolite transmitter.

18. The method of claim 13, wherein said step (F) further comprises:
(F2) detecting at least one said laser beam generated by said stationary laser transmitter positioned in said location with known coordinates.

19. The method of claim 13, wherein said step (G) further comprises:
(G1) determining the 3-D position coordinates of said mobile integrated radio (pseudolite) receiver/laser detector (RR_LD) at said first level of accuracy based on said second plurality of received external radio signals; and based on said at least one internal radio signal broadcasted by said stationary self-positioning radio (pseudolite) transceiver; and
(G2) determining said elevation coordinate of said mobile integrated radio receiver/laser detector (RR_LD) at said second level of accuracy based on said at least one detected laser beam; wherein a set of measurements determined at said second level of accuracy is more accurate than said set of measurements determined at said first level of accuracy.

20. The method of claim 13, wherein said step (G) further comprises:
- (G3) assigning different weights to different sets of measurement data based on a measurement algorithm by using a weighting processor; wherein said measurement algorithm is optimized to take into account at least one measurement site parameter at the time of measurement; and wherein each said measurement site parameter is selected from the group consisting of: topology of said site; weather conditions at said site; and visibility of at least one said laser beam at said site.

21. A method of determining the position coordinates of a mobile user comprising:
- (A) providing a radio and light based 3-D positioning system comprising a stationary self-positioning radio (pseudolite) transceiver, and a stationary laser transmitter positioned in a location with known coordinates;
- (B) receiving a first plurality of external radio signals by using said stationary self-positioning radio (pseudolite) transceiver;
- (C) determining position coordinates of said stationary self-positioning radio (pseudolite) transceiver based on said first plurality of received external radio signals;
- (D) broadcasting at least one internal radio signal by said stationary self-positioning radio (pseudolite) transceiver; and
- (E) generating at least one laser beam by using said stationary laser transmitter positioned in said location with known coordinates;

wherein said mobile user comprising a mobile integrated radio receiver/laser detector (RR_LD) is configured to receive a second plurality of external radio signals, is configured to receive at least one said internal radio signal broadcasted by said stationary self-positioning radio (pseudolite) transceiver, is configured to detect said laser beam generated by said stationary laser transmitter positioned in said location with known coordinates, and is configured to determine its 3-D position coordinates based on a set of data selected from the group consisting of: said second plurality of received external radio signals; said at least one received internal radio signal; and said at least one detected laser beam.

* * * * *